June 17, 1947.  P. FLURY  2,422,614

DEVICE FOR THE SPEED REGULATION OF ELECTRIC COMMUTATOR MACHINES

Filed June 13, 1939   3 Sheets-Sheet 1

INVENTOR
PLACIDO FLURY
BY
Young, Emery & Thompson
ATTYS.

June 17, 1947.    P. FLURY    2,422,614
DEVICE FOR THE SPEED REGULATION OF ELECTRIC COMMUTATOR MACHINES
Filed June 13, 1939    3 Sheets-Sheet 2

INVENTOR
PLACIDO FLURY
BY
Young, Emery & Thompson
ATTYS.

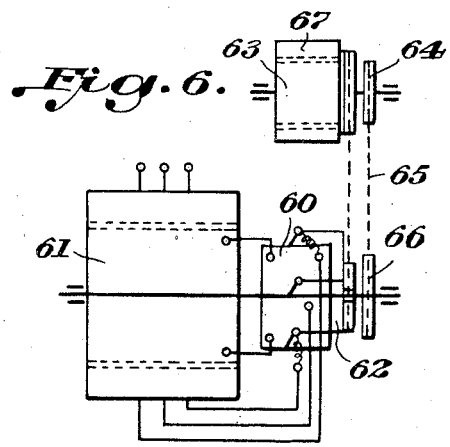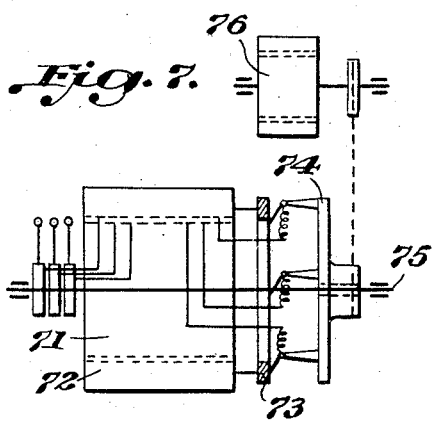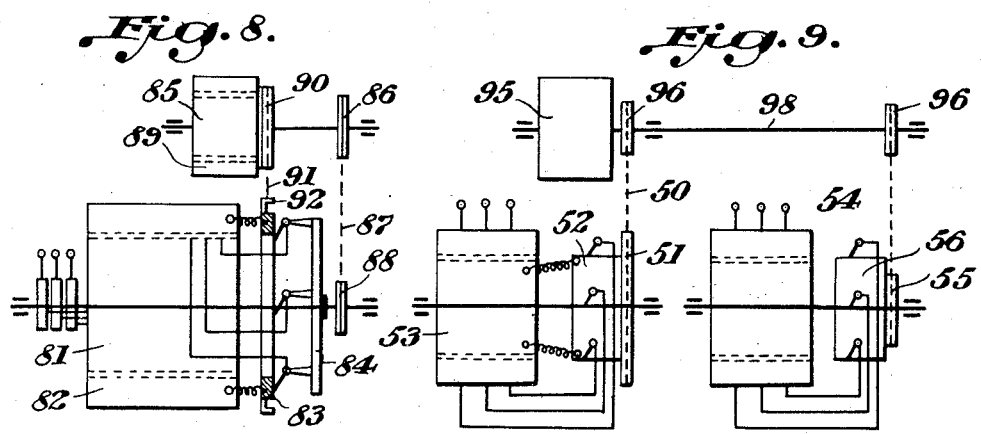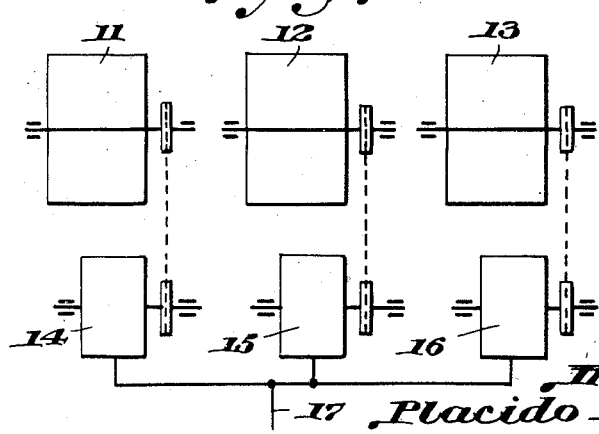

Patented June 17, 1947

2,422,614

UNITED STATES PATENT OFFICE 2,422,614

DEVICE FOR THE SPEED REGULATION OF ELECTRIC COMMUTATOR MACHINES

Placido Flury, Novara, Italy; vested in the Attorney General of the United States Application June 13, 1939, Serial No. 278,941
In Italy June 25, 1938

Sections 3 and 14, Public Law 690, August 8, 1946.
Patent expires June 25, 1958

10 Claims. (Cl. 172—274)

The present invention relates to the speed regulation of electric commutator machines, and more particularly to speed regulation systems, where the speed and direction of rotation of the driven shaft may be controlled at will, independently of the load.

The possibility of the speed regulation of electric commutator machines by means of brush displacement is known. If it is a question of shunt-machines, a definite brush position corresponds to a definite speed, this latter remaining practically constant at variable load. If, however, they are series wound, the speed varies with the load variation, unless continuously regulated by means of brush displacement.

The main object of the invention is to provide means for maintaining constant the speed of any commutator machine at variable load, by an auxiliary device, which controls, in a continuous way, the position of the rotor field in relation to the stator field.

Another object of the invention is to provide means for varying in a well defined way the speed of any commutator machine by an auxiliary device controlling in a continuous manner the relative position of the brushes with respect to the commutator of said machine.

A further object of the invention is the provision of a damper capable of avoiding the hunting of the machine.

A further object of the invention is to obtain the said speed regulation by means of an auxiliary device, which requires for its control a very small power, and consequently its speed may be controlled at will in a very easy manner.

According to the invention, the brush displacement or shift (or more generally, the position of the rotor field in relation to the stator field or vice-versa) is obtained by the instantaneous difference between the angular velocities of the commutator machine and the auxiliary device, hereafter termed a "pilot device."

The pilot device is connected to the regulative member of the commutator machine (say the commutator or the brush carrier), so as to shift said member in such a way as to obtain automatically and continuously on the main machine the desired speed. Thus, when the rotor of the machine will tend to decrease its angular speed with respect to the speed of the pilot device, the resulting shift will cause an increase of the torque on the rotor shaft, in order to maintain the speed of the rotor at the valve corresponding to the speed of the pilot device.

On the contrary, when the rotor of the machine will try to increase its angular speed with respect to the speed of the pilot device, the resulting shift will cause a decrease of the torque on the rotor shaft, so as to maintain the speed of the rotor at the value corresponding to that of the pilot device.

The speed of the pilot device may be either maintained at a constant value or changed in any desired way, in order to maintain the speed of the main machine constant or varying in the said desired way.

The commutator machines, automatically regulated by the device forming the object of this invention, work always with excellent efficiency and power factor, even with partial loads. Using, for example, the device for a machine with series characteristics, there are the remarkable advantages of a strong starting torque with smallest charging rate, without the known disadvantages deriving from the inconstancy of the speed in relation to the load.

The invention finds therefore full application in cases of variable load or speed, in cases where both vary, as well as also in cases where a well constant or a well definite speed is required, or also in cases where the speed should vary in a well definite way, as it is the case with paper-machines, rolling-mills, all kinds of mills, textile machines, machine tools, transporting and lifting devices, elevators, and the like.

This invention is also useful when a driving device cannot be actuated by hand, as it should be, due to the great force required. A pilot device according to the invention may in such cases be successfully used in substitution of heavy and expensive gears and arrangements. All the movements effected upon the pilot device with a minimum of effort are rigorously reproduced by the driving shaft, but with any desired higher power ratio, and such as to surpass easily the force required.

The ways of practical execution are various; four of them are fundamental, as the regulating member may be applied upon the stationary part or stator or upon the rotating part of the machine or rotor, and the regulation may be obtained by means of the angular displacement of the brushes or of the commutator. The invention is hereinafter more fully explained with reference to the accompanying drawings which show some examples of practical application thereof. In these drawings:

Figs. 6, 7 and 8 show diagrammatically three other fundamental arrangements embodying the invention.

Fig. 9 shows diagrammatically the application of the present invention to the regulation of a group of two electric commutator machines by means of a single pilot device.

Fig. 10 shows very diagrammatically another application of the invention to several electric commutator machines.

Figure 1:
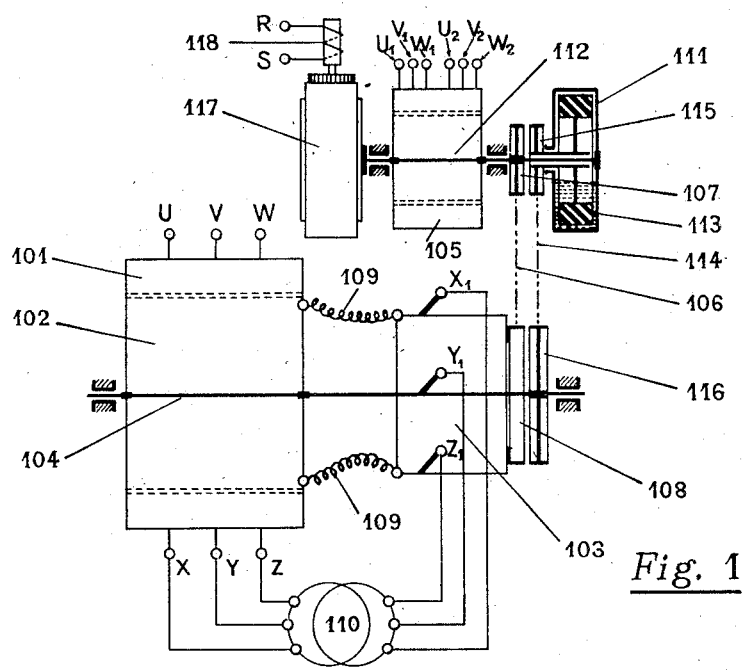
Fig. 1 shows the application of the invention at a series three-phase commutator machine wherein the regulation is done by means of displacement of the commutator, which is loose on the rotor shaft, whilst the brushes are stationary.

Referring to Fig. 1, its lower part shows a series commutator machine of normal and known construction, of which 101 is the stator and 102 the rotor. The only variation is, that the commutator 103 is loose upon the axle 104, instead of being united with the rotor 102, and is driven by the pilot motor 105 by means of the belt or chain 106 and the pulleys 107 and 108, or by means of other transmission systems. The connections between the angularly movable commutator 103 and the rotor winding 102 are realized by means of flexible conductors 109, or by means of sliding contacts. The brushes $X_1$—$Y_1$—$Z_1$, however, are stationary. The regulation is obtained through the difference between the angular speed of the commutator 103 and that of the rotor 102 of the machine, the commutator 103 being loose upon the rotor shaft 104. Therefore an angular displacement of the commutator 103 in relation to the rotor 102 results, instead of the angular displacement of the brushes $X_1$—$Y_1$—$Z_1$ in relation to the stator 101, this latter being a generally known and used system.

Further, whilst in this latter case of known application the torque and the speed increase by displacing the brushes $X_1$—$Y_1$—$Z_1$ in relation to the stator 101 in opposition to the direction of running, the torque and the speed increase in the example of Fig. 1 with the angular displacement of the commutator 103 in relation to the rotor 102 in the direction of running.

The machine is fed through the terminals U—V—W, which are the terminals of the stator-winding 101, whilst the other winding terminals X—Y—Z are connected with the brushes $X_1$—$Y_1$—$Z_1$, by interposition of the transformer 110 for the reduction of the commutation voltage.

The regulation device works as follows: Displacing the commutator 103, which has to be in neutral position, by means of the pilot motor 105, the torque of the rotor 102 increases as the angle of displacement increases until it overcomes the load. In this moment the rotor 102 begins to rotate and starts. It follows the commutator 103, and the acceleration is maintained, until the moment at which the angle of displacement is decreased, so as to attain the equilibrium between the motor torque and the load. When the load increases, the rotor 102 remains retarded in relation to the commutator 103, causing the increase of the angle of displacement, and in consequence the motor torque increases, until it overcomes the greater load. When the load on the machine decreases, the rotor 102 overtakes the commutator 103, causing a decrease in the angle of displacement, and in consequence the motor torque decreases, until the equilibrium is again obtained. By increasing the speed of the commutator 103 in relation to the rotor 102, the angle of displacement is increased and therefore also the motor torque, enabling the rotor 102 to increase its speed, until it reaches that of the commutator 103. By decreasing the speed of the commutator 103, the rotor 102 advances the commutator, causing the decreasing of the angle of displacement, and in consequence the motor torque decreases, to reduce the speed of the rotor 102, making it equal to that of the commutator 103. The rotor 102 follows therefore continuously all the movements of the commutator 103 in a synchronous manner, that is to say all the movements of the pilot motor 105, and independently of the load. The commutator 103 and the rotor 102 can vary their relative position only within the limits of the angle of displacement of these two members to each other. This angle is less than +180 electrical degrees in case of a series connected motor; practically there is regulated within about +150 electrical degrees from the neutral position.

In order to avoid hunting of the rotor 102 in relation to the commutator 103, as this is easily the case in all synchronous machines, a damper is arranged between the two members. It comprises a cylindrical hollow body 111, which is adjusted upon the pilot axle 112, and a flywheel 113 arranged very closely spaced into said cylinder, which is filled with a damping liquid generating there a hydraulic friction. The movement of the rotor 102 or of the driving axle 104 is transmitted to the inner body 113 of the damper by means of the belt or chain 114 and the wheels 115 and 116, or by means of other transmission systems.

To avoid in case of excessive overload displacement of the rotor 102 in relation to the commutator 103 in excess of the normal limits of +150 electrical degrees, stopping members or the like, preferably resilient ones, are used.

These members are quite similar to those illustrated in Fig. 5 and hereinafter described.

A second fundamental arrangement (Fig. 6) provides a known commutator machine with commutator 60 fixed upon the rotor 61 and movable brush yoke ring 62. The rotor of the pilot motor 63 is coupled by means of a transmission system 64, 65, 66, with the rotor 61 of the main machine, whilst its stator 67 is coupled in an analogue way with the brush yoke ring 62. The stator of the pilot motor is therefore arranged so as to effect easily an angular displacement similar to that of the brush yoke ring. The feeding of the pilot motor has necessarily to be effected by means of flexible conductors or the like. The operation is similar to that precedently described and varies inasmuch as the rotor 63 of the pilot motor being connected to that of the main machine, the stator 67 of the pilot motor being suitably arranged for an angular displacement and moves by reaction, carrying with it the brush yoke ring 62, and regulating in this way continuously the speed of the main machine, in order that it be identical with the speed of the pilot motor. To avoid hunting of the shaft of the main machine, the movement of the stator of the pilot motor, as well as that of the brush yoke ring, is damped by damping devices, which are not shown on the drawing.

A third fundamental arrangement is shown in Fig. 7, where a series three-phase commutator machine is provided with a primary winding wound upon the rotor 71 while the secondary or commutator winding is placed upon the rotor 71, whilst the secondary winding is placed upon the stator 72 and connected with a stationary commutator. The brush yoke ring 74 is placed loose upon the rotor shaft 75 of the main machine and is driven by a pilot shaft 76, in the same way as the commutator 103, loose upon the shaft 104, was driven by the pilot shaft 112 in the embodiment of Fig. 1.

The speed of the rotor 71 of the driving device is regulated by regulating the speed of the brush yoke ring 74, by means of the pilot device. In relation to the rotor, the movement of the brushes is an angular displacement from 0 to +150 electrical degrees, from its neutral position.

The fourth fundamental arrangement (Fig. 8) provides an arrangement similar to the precedent one, with the difference that the brush yoke ring 84 is fixed upon the rotor 81, whilst an angular displacement of the commutator 83 which is mounted upon the stator 82 is possible. The electric connection between the stator and the commutator 83 is obtained by means of flexible conductors. As in the second arrangement, the rotor 85 of the pilot motor is mechanically connected to the rotor 81 of the main machine through the transmission 86, 87, 88, whilst the stator 89 of the pilot motor—arranged for an angular displacement—is connected through the transmission 90, 91, 92 to the commutator. The regulation is obtained as follows: When the stator of the pilot motor moves through the effect of reaction, it carries the commutator 83 with it, the rotor 85 of the pilot motor being coupled rigidly with the shaft 93 of the main motor. To avoid hunting, it is necessary to damp suitably the regulating movement by means of damping devices, which are not shown on the drawing.

In addition to the above said four fundamental arrangements and of which Fig. 1 is one of the most interesting, there are many other possibilities of application of this invention.

Figure 2:
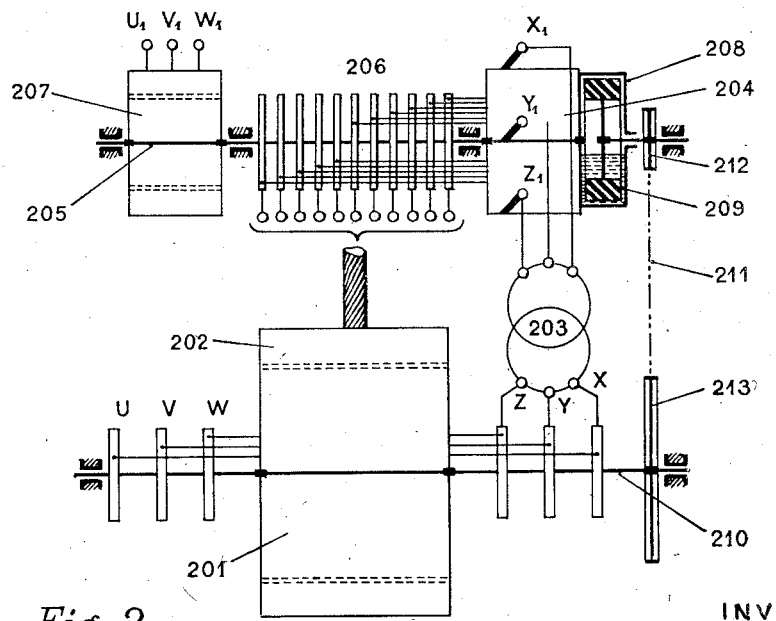
Fig. 2 shows said application at a series three-phase commutator machine wherein the commutation structure is mechanically separated from the main machine and the pilot device is represented by a three-phase induction motor, the commutator being loose upon the pilot shaft, whilst the brushes are stationary.

Fig. 2, for instance, provides the commutator structure independent of the main motor and upon the pilot device. Also here the controlled machine is a series three-phase motor. As shown, the primary winding is placed upon the rotor 201 and the commutating winding upon the stator 202. The current is fed to the rings U—V—W connected to the primary winding, and the circuit extends from said rings through the rings X—Y—Z and through the transformer 203 to the brushes X₁—Y₁—Z₁. The bars of the commutator 204 placed upon the pilot shaft 205 are connected to a corresponding number of rings 206, which are in connection with the commutation winding of the stator 202. For the sake of clearness the pilot motor 207 is shown as a three-phase induction motor fed at the terminals U₁—V₁—W₁. To avoid hunting, a damper is provided, the outer member 208 of which is fixed to the pilot shaft 205, whilst the inner member 209 thereof is loose upon said shaft. The movement of the driving shaft 210 is transmitted to said member 209 by a belt or chain 211 and by the pulleys 212 and 213, or the like. With this arrangement a commutator of only 2 or 4 poles may be provided, whilst the main motor may have a number of poles being a multiple thereof.

In the arrangement of Fig. 2, as in any of the other arrangements described, it is possible to use instead of a rotating commutator and stationary brushes, a stationary commutator and a set of brushes rotatable about its shaft, without departing from the spirit of the invention.

Further it is not necessary that the pilot motor be an electric motor. Any suitable device may be used in substitution of said electric motor. As pilot devices, however, are particularly adapted any types of electric variable speed motors, and therefore especially direct current motors with variable tension feeding, as the known and so-called Ward-Leonard motors.

Further, it is always necessary that the pilot shaft be resilient, so that may follow easily these small movements necessary to avoid hunting between driving shaft and pilot shaft. Of course, the transmission means between the pilot shaft and the regulation member have to be reversible and of good efficiency in both directions, that is from the pilot device to the regulating member and vice-versa. The use of worm and helicoidal gears is therefore not possible.

It is further possible to regulate the angular speed of whole motor groups, also if the speeds of the single motors are different among themselves, so that the ratio between the speeds of the different motors remain constant.

It is obvious that such a speed control may be obtained by means of several pilot devices, say providing each commutator machine with a pilot device, as it is shown in Fig. 10. In said Fig. 10, three electric commutator machines, 11, 12 and 13, are respectively controlled by three pilot electric motors 14, 15, 16, which are fed by a common electric feeding line 17. By varying for instance the electric tension or the frequency of said line 17, the speed of all the pilot motors may be varied, as it is known, at the same ratio, in order to vary the speeds of all the machines 11, 12 and 13, without changing the ratio between said machine speed.

But the speed regulation of several commutator machines may also be obtained by connecting a single pilot shaft to each of the commutator machines to be controlled.

Such an arrangement is shown in Fig. 9, where the pilot device 95 is adapted to control two electric commutator machines 53 and 54, running at different speeds. Both of these machines are arranged as the machine above described, with reference to Fig. 1.

On the shaft 98 of the pilot device 95 are mounted two pulleys 96 and 97, which are respectively connected to the pulleys 51 and 55, having different diameters and being respectively fastened to the commutators 52 and 56 of the machines 53 and 54. Said commutators 52 and 56 are loose on their respective rotor shafts, as in the arrangement shown in Fig. 1. As the operation of this speed regulation system is quite similar to that of the system shown in Fig. 1, a particular description of the operation of the arrangement shown in Fig. 9 is not believed to be necessary. Therefore, as the diameters of the pulleys 51 and 55 are different, it will be easily understood that the pilot device 95 is adapted to control two machines running at different speeds, and further to maintain rigorously constant the speed ratio between the two said commutator machines.

The electric commutator machines controlled according to the invention may also be provided with well-known devices for controlling the neutral position of the regulation member and for bringing said member into its neutral position before the starting of the machine. But as such arrangements are already known, they are not particularly described herein.

An important member for these arrangements is the damper. Said damper may assume many structural embodiments. In any case a very slow acting damper is required, having a very smooth and gradual action, the damping effect of which, however, has to increase with the increasing of the rapidity of the regulating displacement. Therefore, any known type of damper may be used, as for instance a hydraulic or magnetic damper. As the construction and operation of said dampers is well known, a further description thereof seems superfluous. The damper may be placed upon the driving shaft, the pilot shaft or upon a special auxiliary shaft.

Figure 3:
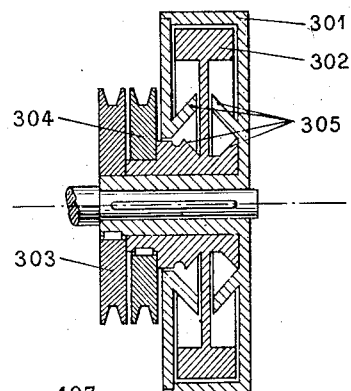
Fig. 3 shows the construction of a damping device to be arranged upon the rotatable part, as shown in the case of Fig. 1.

Fig. 3 shows an example of a hydraulic damper, when the regulating member is on the rotating part of the commutator machine, as it is the case of Fig. 1. As may be seen, it comprises an outer cylindrical body 301, composed of two parts tightly assembled, and of an inner body 302 which faces and is very closely spaced to the outer one, in order to avoid a mechanical friction. One of the two bodies depends on the pilot shaft and the other one on the driving shaft, to which they are connected respectively by means of the pulleys 303 and 304. The interior of the damper contains a liquid that fills the space left between the said bodies, and generates hydraulic friction when one of said bodies moves relative to the other one. When the damper is rotating, the liquid is subjected to centrifugal force, which distributes it equally upon the whole of the circumference, increasing the pressure and generating in consequence a more appreciable friction, which increases the damping effect. The friction may be increased considerably through adequate roughening or the provision of small teeth upon one or both the two damping bodies.

The running out of the liquid when the damper is stationary, is avoided by means of suitable circular vanes 305 projecting against the inside, whilst when moving running out of the liquid is avoided through the centrifugal force.

When the regulating member is placed upon a fixed part of the commutator machine, the damper may be of the type shown in Fig. 3, suitably dimensioned.

Figure 4:
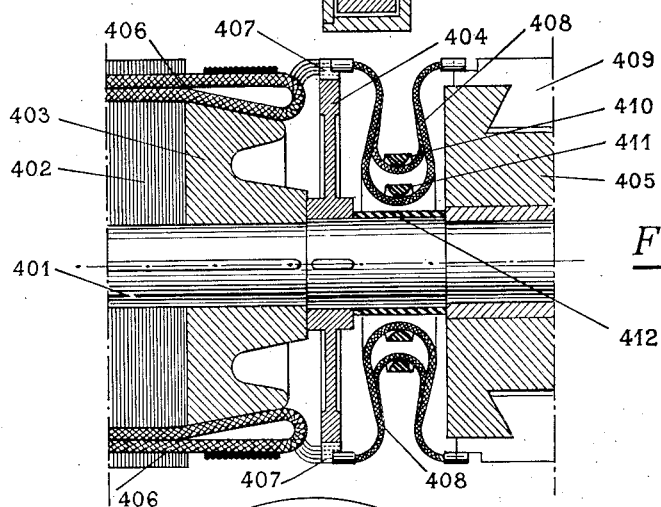
Fig. 4 shows the arrangement of the flexible conductors on a machine where the commutator is mounted loose on the rotor, as in the example of Fig. 1.

Fig. 4 shows the arrangement of the flexible conductors in the case of a commutator movable in relation to the rotor winding, as for instance in the case of Fig. 1. Upon the rotor shaft 401 are keyed the lamination of stampings 402, the pressure means 403 and the disk 404, whilst the commutator 405 is loose. The ends 407 of the commutation winding 406 are arranged in correct order upon a suitable disk 404, where they are connected with the flexible conductors 408, which connect the winding with the bars 409 of the commutator 405; 410 and 411 are rings to keep the flexible conductors in their place, and that especially with regard to the centrifugal force; 412 is an insulating ring. With this arrangement the wear and tear of the material is reduced to a minimum. The required space is reduced to a minimum. According to the displacing angle, which varies with the number of poles, and according to the space available, the conductors may be arranged also in form of flexible ribbons, instead of flexible strands. In order to insure a greater flexibility, a minimum of wear and tear of the material and a minimum of space, particular forms may be devised. The flexible conductors 408 may, according to the space available, instead of being bent towards the centre of the shaft 401 from the winding, be bent towards outside and bent back again, to be connected with the commutator.

Figure 5:
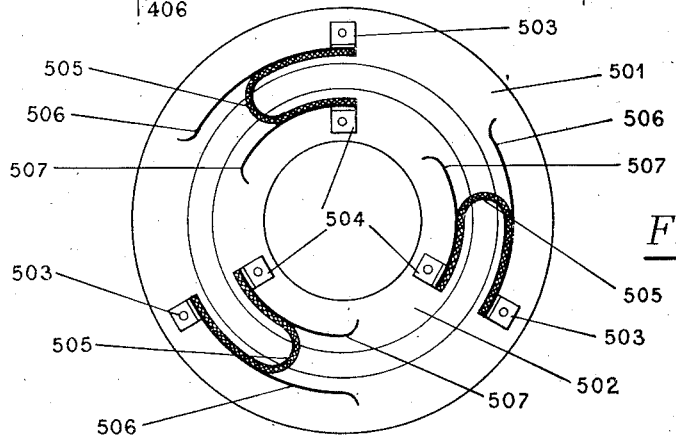
Fig. 5 shows the arrangement of the flexible conductors on a machine where the brushes are angularly movable with respect to the stationary part of the commutator machine.

Fig. 5 shows an arrangement of the flexible conductors, adapted for a brush yoke ring placed loose upon the fixed part of the three-phase machine. In said Fig. 5 the brush yoke ring 501 is enabled to accomplish angular displacements with respect to the regulating field comprised from about 0 to +150 electrical degrees. In order to prevent an excessive and undesired displacement of the brush holder 501 with respect to the ring 502 fixed on the stator of the machine, a projecting member or nose 509 is provided on the brush holder 501. Said nose 509 is adapted to be stopped by two stopping members 508 provided on the ring 502, when its displacement tends to become excessive. 503 and 504 are the respective current terminals and 505 the flexible current conductors in the form of a flexible plaited wire or a ribbon or the like. In order to insure, in all the positions the two rings 501 and 502 may assume relative to each other, a proper positioning of the flexible conductors 505 with a minimum of stress and a minimum driving effort, said flexible conductors are kept by suitable bows 506 and 507.

The examples so far described provide for the application of the invention to series wound three-phase motors, as the three-phase system of the electric energy distribution is the most commonly adopted. However, the invention may be used for alternating, single-phase and polyphase-current commutator machines, as well as also for direct current machines of any kinds, having series, shunt or compound windings. The invention is also applicable to the Schrage and Deri motors and other systems with double brush sets.

What I claim is:

1. In a speed regulation system for electric commutator machines of either shunt or series wound type, the combination of a stator with stator winding and a rotor with rotor winding for the said main machine; a commutator system embodying a commutator electrically connected to one of said windings, and a set of brushes for said commutator, the brush set and commutator being movably disposed relative to each other, for varying the speed of the machine; a pilot device for automatically and continuously controlling the displacements of one member of the commutator system relative to the other, in order to maintain the speed of the machine corresponding to the speed of the pilot device; a suitable transmission system connecting said pilot device to said one member of the commutator system, flexible conductors connecting said one member to the corresponding winding, and a damping device for avoiding hunting of the machine, said damping device having an element rotatable with the rotor of the machine and a second element movable relatively to the first element thereof and rotatable with the movable member of the commutator and means frictionally connecting said elements.

2. In a speed regulation system for electric commutator machines of either shunt or series wound type, the combination of a stator with stator winding and a rotor with rotor winding for the said main machine; a commutator system embodying a commutator electrically connected to one of said windings, and a set of brushes for said commutator, the brush set and commutator being movably disposed relative to each other, for varying the speed of the machine; a pilot device for automatically and continuously controlling the displacements of one member of the commutator system relative to the other, in order to maintain the speed of the machine corresponding to the speed of the pilot device; a suitable transmission system connecting said pilot device to said one member of the commutator system, flexible conductors connecting said one member to the corresponding winding; stop means for limiting the displacement of said one member and a damping device for avoiding hunting of the machine, said damping device having an element rotatable with the rotor of the machine and a second element movable relatively to the first element thereof and rotatable with the movable member of the commutator and means frictionally connecting said elements.

3. In a speed regulation system for several electric commutator machines, in combination with said machines, a commutator system embodying a commutator and a set of brushes, the brush set and commutator being movably disposed relative to each other, on each machine for varying the speeds of the machines; a single pilot device for automatically and continuously controlling the displacements of one member of each commutator system, in order to maintain the speed of every machine corresponding to the speed of the pilot device; transmission systems connecting said pilot device to said one member of each commutator system; flexible conductors connecting said one member to the corresponding windings; and damping devices for avoiding hunting of said machines.

4. In a speed regulation system for several electric commutator machines, in combination with each machine: a commutator system embodying a commutator and a set of brushes, the brush set and commutator being movably disposed relative to each other, for varying the speed of the machine; a pilot device for automatically and continuously controlling the displacements of one member of the corresponding commutator system, in order to maintain the speed of each machine corresponding to the speed of its pilot device; a transmission system connecting the pilot device to said one member of the corresponding commutator system and a damping device for avoiding hunting of the machine, said damping device having an element rotatable with the rotor of the machine and a second element movable relatively to the first element thereof and rotatable with the movable member of the commutator, and means frictionally connecting said elements, said pilot devices being fed by the same electric feeding line, in order to vary contemporaneously and at the same ratio the speeds of the several pilot devices and consequently the speeds of the several machines.

5. In a speed regulation system for electric commutator machines of either shunt or series wound type, the combination of a stator with stator winding and a rotor with rotor winding for the said main machine; a commutator electrically connected to the rotor winding and mounted loose on the rotor shaft; a set of brushes for said commutator secured to said stator; a pilot device for automatically and continuously controlling the position of the commutator with respect to the rotor winding; a suitable transmission system connecting the pilot rotating shaft to the commutator of the main machine; flexible conductors connecting the commutator to the rotor winding; and a damping device for avoiding hunting between the commutator and the main machine rotor, said damping device having an element rotatable with the commutator, a second element rotatable with the rotor shaft, and means for frictionally coupling said elements together.

6. In a speed regulation system for electric commutator machines of either shunt or series wound type, the combination of a stator with stator winding and a rotor with rotor winding for the said main machine; a commutator electrically connected to the rotor winding and mounted loose on the rotor shaft; a set of brushes for said commutator secured to said stator; a pilot electric motor for automatically and continuously controlling the position of the commutator with respect to the rotor winding; a suitable transmission system connecting the rotor shaft of the pilot motor to the commutator of the main machine; flexible conductors connecting the commutator to the rotor winding; a damping device comprising a cylindrical hollow member secured to the shaft of the pilot motor; a flywheel mounted loose on said shaft and arranged very closely spaced into said hollow member, said hollow member being filled with a damping liquid which is prevented from flowing out by means of suitable inclined projections provided therein; and a transmission system connecting said flywheel to the shaft of the main machine.

7. In a speed regulation system for electric commutator machines of either shunt or series wound type, the combination of a stator with stator winding and a rotor with rotor winding for the said main machine; a commutator electrically connected to the rotor winding and mounted loose on the rotor shaft; a set of brushes for said commutator secured to said stator; a pilot motor for automatically and continuously controlling the position of the commutator with respect to the rotor winding; a suitable transmission system connecting the rotor shaft of the pilot motor to the commutator of the main machine; flexible conductors connecting the commutator to the rotor winding, each of said conductors forming a hoop lying nearly in a longitudinal plane passing through the axis of the commutator and being kept in its position by suitable rings; and a damping device to avoid hunting of the machine.

8. In a speed regulation system for electric commutator machines of either shunt or series wound type, the combination of a stator with stator winding and a rotor with rotor winding for the said main machine; a pilot electric motor having an adjustable stator for automatically and continuously regulating the relative position between the rotor field and the stator field, a commutator rigidly mounted on the rotor shaft of the main machine and connected to the rotor of the auxiliary motor; an angularly movable brush holder, connected to the adjustable stator of said pilot motor; transmission systems connecting the pilot motor to the main machine; said damping device having an element rotatable with the brush holder, a second stationary element, and means for frictionally coupling said elements together, a damping device to avoid hunting of the machine; flexible conductors connecting said movable brushes to the corresponding windings, each conductor forming a hoop lying nearly in a plane at right angles to the axis of rotation and being kept in its position by restraining straps.

9. In a speed regulation system for electric commutator machines of either shunt or series wound type, the combination of a stator with stator winding and a rotor with rotor winding for the said main machine; a commutator secured to the stator of said main machine; a brush holder mounted loose on the main rotor shaft; a pilot motor for automatically and continuously controlling the position of the said brush-holder with respect to the rotor, a transmission system connecting the shaft of the pilot motor to said brush-holder; a damping device to avoid hunting of the machine, said damping device having an element rotatable with the shaft of the machine, a second element rotatable with the shaft of the pilot motor, and means for frictionally coupling said elements together; and flexible conductors connecting the adjustable brushes to the rotor winding.

10. In a speed regulation system for electric commutator machines of either shunt or series wound type, the combination of a stator with stator winding and a rotor with rotor winding for the said main machine; a pilot electric motor having an adjustable stator and operable for automatically and continuously regulating the relative position between the rotor field and the stator field; a commutator for said main machine, angularly movable in relation to the main stator, and mechanically connected to the adjustable stator of the auxiliary motor; a brush holder secured to the main motor and mechanically connected to the rotor of the said pilot motor; transmission systems connecting said pilot motor to the main machine; a damping device to avoid hunting of the main machine, said damping device having an element rotatable with the commutator, a second stationary element, and means for frictionally coupling said elements together; and flexible conductors connecting said commutator to the stator winding of the main machine.

PLACIDO FLURY.

REFERENCES CITED

The following references are of record in the file of this patent:

UNITED STATES PATENTS

| Number    | Name       | Date           |
|-----------|------------|----------------|
| 510,534   | Gorges     | Dec. 12, 1893  |
| 1,481,898 | Hall       | Jan. 29, 1924  |
| 1,033,474 | Schenkel   | July 23, 1912  |
| 1,254,221 | Fynn       | Jan. 22, 1918  |
| 343,886   | Brush      | June 15, 1886  |
| 517,866   | Keith      | Apr. 10, 1894  |
| 522,241   | Thomson    | July 3, 1894   |
| 1,642,438 | Granat     | Sept. 13, 1927 |
| 1,526,613 | Stephenson | Feb. 17, 1925  |

FOREIGN PATENTS

| Number  | Country       | Date           |
|---------|---------------|----------------|
| 118,694 | Great Britain | Sept. 12, 1918 |
| 398,325 | Great Britain | Sept. 14, 1933 |

OTHER REFERENCES

"The A. C. Commutator Motor," by C. W. Oliver; Chapman and Hall, Ltd., London, England, 1927; (pages 75 to 79, inclusive).